United States Patent [19]

Nagasawa et al.

[11] Patent Number: 5,519,448
[45] Date of Patent: May 21, 1996

[54] VIDEO SIGNAL PROCESSING APPARATUS

[75] Inventors: Kenichi Nagasawa, Kawasaki; Koji Takahashi, Yokohama; Chikara Sato, Kawasaki, all of Japan

[73] Assignee: Canon Kabushiki Kaisha, Tokyo, Japan

[21] Appl. No.: 372,879

[22] Filed: Jan. 13, 1995

Related U.S. Application Data

[63] Continuation of Ser. No. 155,634, Nov. 22, 1993, abandoned, which is a continuation of Ser. No. 794,250, Nov. 19, 1991, abandoned.

[30] Foreign Application Priority Data

Nov. 20, 1990 [JP] Japan ................................ 2-316250

[51] Int. Cl.$^6$ ....................................... H04N 5/14
[52] U.S. Cl. ..................... 348/559; 358/335; 360/10.1
[58] Field of Search ................................ 348/155, 578, 348/559; 358/335, 444; 360/10.1

[56] References Cited

U.S. PATENT DOCUMENTS

| | | | |
|---|---|---|---|
| 4,080,626 | 3/1978 | Hurst et al. | 358/22 |
| 4,130,834 | 12/1978 | Mender | 358/909 |
| 4,403,250 | 9/1983 | Kellar | 358/105 |
| 4,475,131 | 10/1984 | Nishizawa | 358/335 |

Primary Examiner—Curtis Kuntz
Assistant Examiner—Minsun Oh
Attorney, Agent, or Firm—Fitzpatrick, Cella Harper & Scinto

[57] ABSTRACT

A video signal processing apparatus provided with a signal processing circuit including a memory capable of storing inputted video signals of one frame. In response to an operation of a manually operable freeze key, writing the video signals to the memory is inhibited, and reading the video signals from the memory is continuously performed. In response to a continuous operation of the freeze key in excess of a predetermined time period, the video signals of one frame are periodically written to the memory, and the video signals in the memory are continuously read. Various special effects can be given to images upon an operation of the single freeze key.

19 Claims, 4 Drawing Sheets

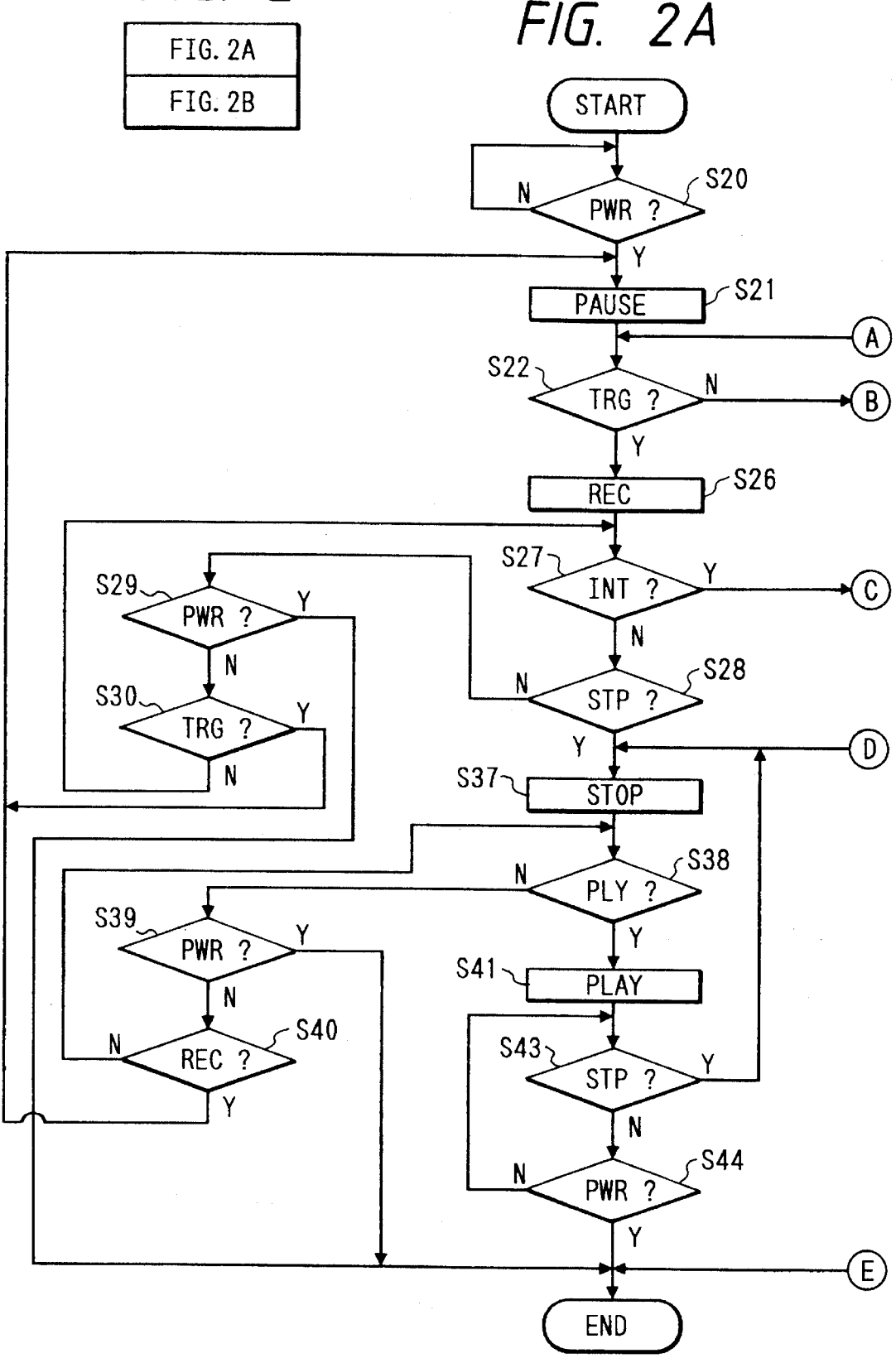

VIDEO SIGNAL PROCESSING APPARATUS

This application is a continuation of application Ser. No. 08/155,634, filed Nov. 22, 1993, now abandoned, which was a continuation of application Ser. No. 07/794,250, filed Nov. 19, 1991, now abandoned.

BACKGROUND OF THE INVENTION

1. Field of the Invention

The present invention relates to a video signal processing apparatus, and more particularly to a video signal processing apparatus having a memory capable of storing video signals of one frame and having a function to freeze an image.

2. Related Background Art

So-called field memories or frame memories capable of storing video signals of one frame have been used recently with various types of general electronic apparatuses. Various techniques for providing video signals with special effects by using memories have been applied to broadcasting electronic apparatuses.

Such special effects have been limited if they are to be provided to general electronic apparatuses because of a limited capacity of a memory and a complicated operation unit.

SUMMARY OF THE INVENTION

In consideration of such circumstances, it is an object of the present invention to provide a video signal processing apparatus having a memory capable of storing video signals of one frame while realizing special effects with simple operations.

In order to achieve the above object, according to one aspect of the present invention, there is provided a video signal processing apparatus, comprising:

(a) a signal processing circuit including a memory capable of storing inputted video signals of one frame;

(b) a manually operable freeze key; and (c) control means for controlling the operation of the signal processing circuit upon operation of the freeze key, responsive to an operation of the freeze key, the control means inhibiting to write the video signal to the memory and allowing to continuously read the video signal from the memory, and responsive to a continuous operation of the freeze key in excess of a predetermined time period, the control means allowing to periodically write the video signals of one frame to the memory and to continuously reading the video signals of one frame from the memory.

According to another aspect of the present invention, there is provided a video signal processing device, comprising:

(a) a signal processing circuit for processing inputted video signals, the signal processing circuit being capable of taking one of first to third modes, in the first mode the video signals for all fields being outputted, in the second mode the inputted video signals of one frame being continuously and repetitively outputted, and in the third mode the video signals of one frame being periodically and repetitively outputted;

(b) a manually operable freeze key; and (c) control means for changing the first to third modes of the signal processing circuit in response to an operation of the freeze key, responsive to an operation of the freeze key the signal processing circuit changing from the first mode to the second mode, and responsive to a continuous operation of the freeze key in excess of a predetermined time period the signal processing circuit changing from the second mode to the third mode.

The other objects and advantages of the present invention will become apparent from the following detailed description of the embodiment when read in conjunction with the accompanying drawings.

BRIEF DESCRIPTION OF THE DRAWINGS

FIGS. 2A and 2B constitute a flow chart illustrating a mode change operation of the VTR with a built-in camera of the present embodiment.

DETAILED DESCRIPTION OF THE PREFERRED EMBODIMENT

An embodiment of a video tape recorder with a built-in camera (hereinafter simply called VTR) of the present invention will be describe hereinbelow.

Figure 1:
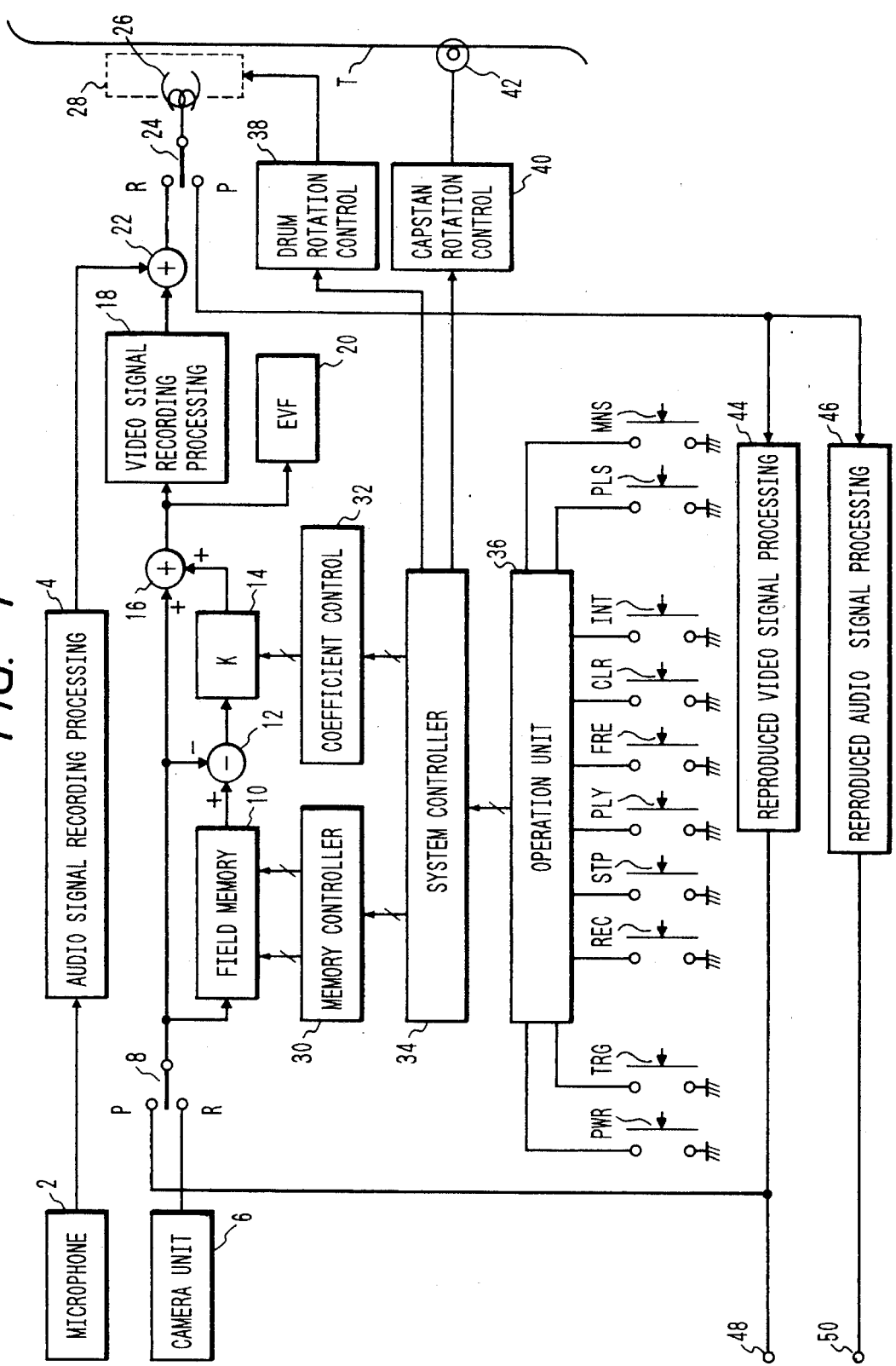
FIG. 1 is a block diagram showing the outline of a VTR with a built-in camera according to an embodiment of the present invention.

FIG. 1 is a block diagram showing the outline of a VTR with a built-in camera according to the embodiment of the present invention. In FIG. 1, reference numeral 36 represents an operation unit of the VTR with a built-in camera. PWR represents a power switch, TRG represents a trigger key, REC represents a record key, STP represents a stop key, PLY represents a play key, FRZ represents a freeze key, CLR represents a clear key, INT represents an interval record key, PLS represents a plus key, and MNS represents a minus key.

Reference numeral 34 represents a system controller for controlling various parts of the apparatus by actuating the operation unit 36. The operation of the VTR with a built-in camera will be described with reference to the flow chart illustrating the operation of the system controller 34.

Figure 2B:
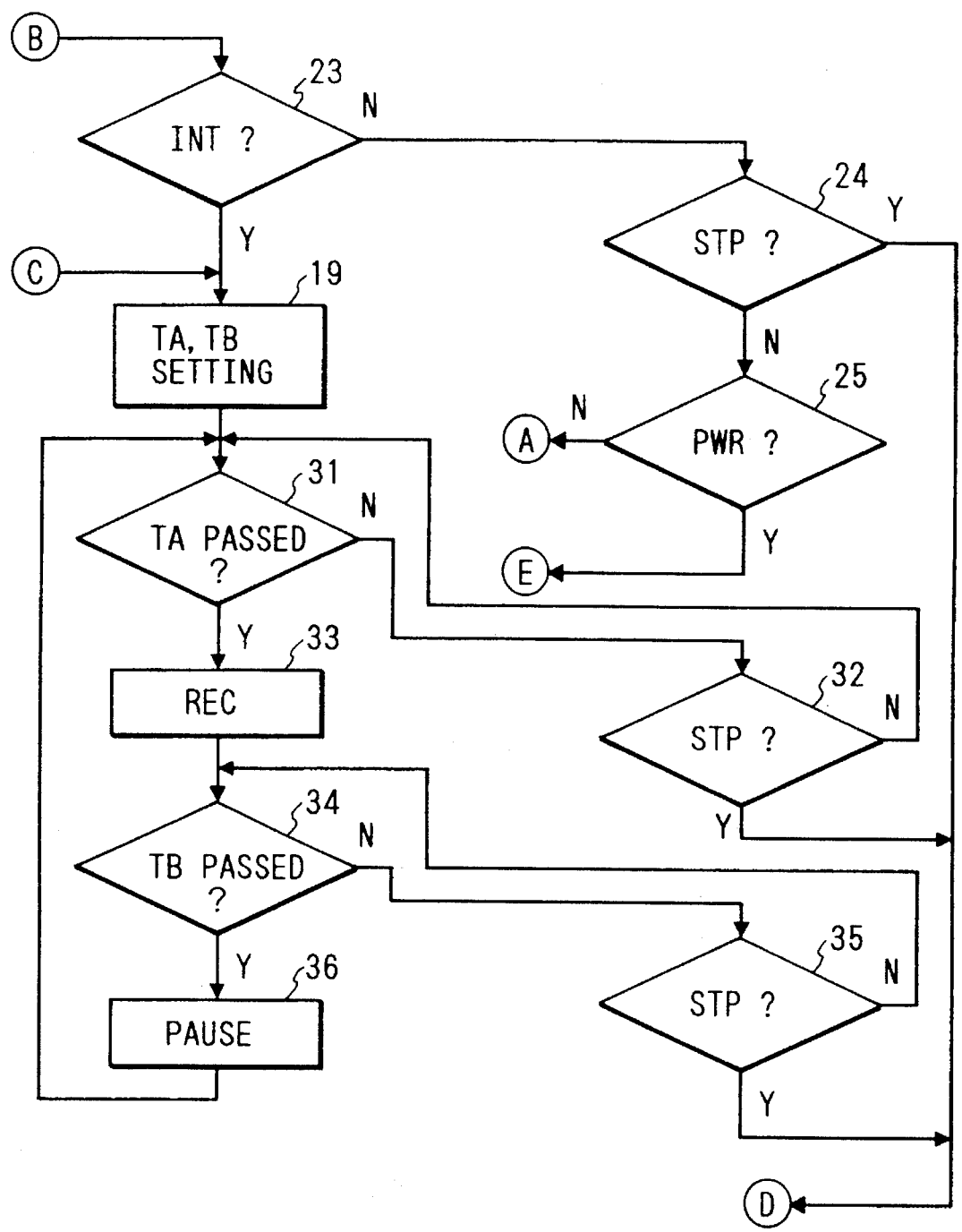

FIGS. 2A and 2B constitute a flow chart illustrating a mode change operation of the VTR with a built-in camera to be executed by the system controller 34.

Upon turning on the power switch PWR (step S20), the apparatus enters a record temporary stop state (record pose state) (Step S21).

In this state, the system controller 34 connects a switch 8 to its R side terminal so that a video signal from a camera unit 6 is supplied to an electronic view finder (EVF) 20 via the switch 8 and an adder 16 and a subject image taken with the camera unit 6 can be monitored on EVF 20. Under control of the system controller 34, a drum rotation control circuit 38 causes a rotary drum 28 mounted on a rotary magnetic head 26 to rotate at the same speed as the recording speed, and causes a capstan rotation control circuit 40 to maintain a capstan 42 in a stop state.

If the trigger key TRG is actuated in this record pose state (Step S22), the apparatus enters a record state (Step S26).

In the record state, a video signal is converted into a video signal suitable for magnetic recording by a video signal recording processing circuit 18, and an audio signal picked up by a microphone 2 is converted into an audio signal suitable for magnetic recording by an audio signal recording processing circuit 4. The video signal and audio signals are then added together by an adder 22 and supplied to a magnetic head 26 via the R side terminal of a switch 24. Under control of the system controller 34, the drum rotation control circuit 38 causes the drum 28 to rotate at a predetermined speed, and causes the capstan rotation control circuit to rotate the capstan 42 at a predetermined speed. In this condition, an output signal from the adder 22 is recorded on a magnetic tape T by the rotary magnetic head 26.

If the trigger key TRG is actuated in this record state (Step S30), the mode returns to the record pose state.

If the interval record key INT is actuated in the record pose state or in the record state (Steps S23 and S27), the control advances to Step S19. At Step S19, the plus key PLS and minus key MNS are actuated to set a time interval TA for the interval record and each record time TB.

In the interval record state, the operation remains in a stand-by state until the record interval time TA lapses (Step S31) and enters the record mode (Step S33). In the record mode, when the record time TB lapses (Step S34), the control enters the record pose state (Step S36). Thereafter, the Steps S31, S33, S34, and S36 are repeated to continue the interval record. It is preferable to set the record interval TA to about 60 seconds, and the record time TB to about 0.5 second.

If the stop key STP is actuated in the record pose state, record state, or interval record state (Steps S24, S28, S32, S35), then the apparatus enters a stop state (Step S37). Specifically, under control of the system controller 34, the drum rotation control circuit 38 and capstan control circuit 40 cause the drum 28 and capstan 42 to stop rotation.

If the record key REC is actuated in the stop state (Step S40), the apparatus enters again the record pose state.

If the play key PLY is actuated in the stop state (Step S38), the apparatus enters a play state. In this play state, under control of the system controller 34, the switches 8 and 24 are connected to the P side terminals, and the drum rotation control circuit 38 and capstan control circuit 40 cause the drum 28 and capstan 42 to rotate at the same speed as the recording speed.

Under this condition, the rotary head 26 reproduces a recorded signal. The reproduced signal is supplied to a reproduced video signal processing circuit 44 and a reproduced audio signal processing circuit 46. A reproduced audio signal processed by the reproduced audio signal processing circuit 46 is outputted externally from an audio signal output terminal 50. A reproduced video signal processed by the reproduced video signal processing circuit 44 is outputted externally from a video signal output terminal 48. This reproduced video signal is also supplied to a field memory 10 and to the adder 16 via the P side terminal of the switch 8 so that the reproduced signal is displayed on EVF 20.

If the stop key STP is actuated in the play state (Step S43), the apparatus enters the stop state. If the power key PWR is actuated in the record pose state, record state, stop state, or play state (Steps S25, S29, S39, S44), then the system controller 34 stops controlling various parts of the apparatus to terminate the processing by the system controller.

Figure 3:
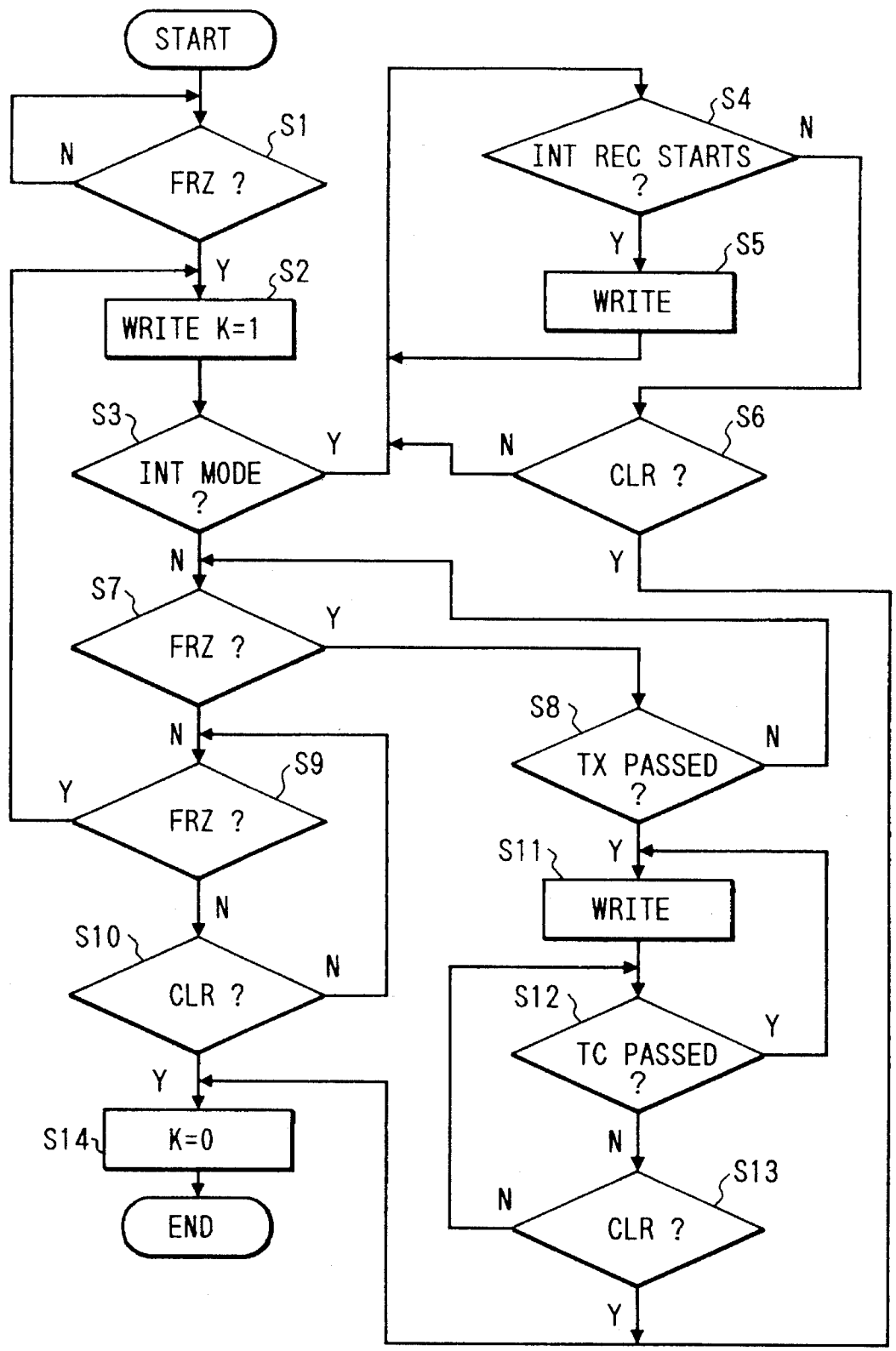
FIG. 3 is a flow chart illustrating a characteristic operation of the VTR with a built-in camera of the present embodiment.

The mode change operation for the VTR with a built-in camera of the present embodiment has been described. Next, the operation for the freeze mode characteristic to the present invention will be described with reference to the flow chart shown in FIG. 3.

In the freeze mode, the field memory 10 is used. As apparent from the foregoing description, the field memory 10 is always supplied with video signals in any state of the apparatus. Therefore, an actuation of the freeze key FRZ is effective in any mode.

When the freeze key FRZ is actuated (Step S1), the system controller 34 causes a memory controller 30 to supply an enable pulse for the period of writing data of one field in to the field memory 10. During this period, video signals of one field are written to the field memory 10. The field memory 10 is made in an enable state to continuously read the video signal therein (Step S2). In this manner, video signals of one field stored in the field memory 10 are repetitively read and displayed as a still image.

A subtracter 12 subtracts the video signals supplied from the switch 8 from the video signals read from the field memory 10, and the subtracted video signals are supplied to a coefficient unit 1. In this case, a coefficient K of the coefficient unit 14 is set as K=1 by a coefficient control circuit 32. Therefore, the video signals from the switch 8 are canceled at the adder 16 so that only the video signals read from the field memory 10 are outputted from the adder 16.

Namely, in the record state, if the freeze key FRZ is actuated, recorded video signals are used for displaying a still image, entering a so-called freeze record mode. If the freeze key FRZ is actuated in the play mode, the reproduced video signals are used for displaying a still image, entering a so-called still image reproducing mode. In both of the freeze record mode and still image reproducing mode, audio signals are continuously recorded and reproduced.

If the apparatus is in the interval record state when the freeze key FRZ is actuated at Step S1 (Step S3), the apparatus holds the interval record state to enter an interval freeze state. In this freeze interval record state, recording is carried out during the record time TB at the record interval TA. At the start of each recording (Step S4), under control of the system controller 34, the memory controller 30 causes the memory 10 to take an enable state during one field period. As a result, a still image is recorded during the predetermined record time TB at the predetermined record interval TA, realizing the freeze interval recording.

The freeze interval record is realized by actuating conventional interval record key INT and freeze key FRZ without using any particular key. Such a novel function can be realized by simple operations. This embodiment therefore provides an effective structure for applying such a novel function to general electronic apparatuses.

If the freeze key FRZ is continuously actuated during a predetermined time period TX after the freeze key FRZ is once actuated at Step S1 (Step S8), the control advances to Step S11 to make the memory 10 in an enable state during one field period at each lapse of a predetermined time period TC (Step S12). As a result, still images are stored in the memory 10 at the predetermined time interval TC, and video signals of different still images are sequentially outputted from the adder 16 at the predetermined time interval TC.

During recording, a stroboscopic record mode is realized wherein different still images are sequentially recorded. During reproducing, a stroboscopic reproduction mode is realized wherein reproduced video signals are displayed as still images changing at the predetermined time interval. In the present embodiment, the stroboscopic (record, reproduction) mode and an ordinary freeze (record, reproduction) mode are realized by actuating only the freeze key FRZ. This embodiment therefore provides a considerably effective structure for applying such a novel function to general electronic apparatuses.

If the freeze key FRZ is released from its actuation within a predetermined time period TX after the freeze key FRZ is actuated at Step S1 (Step S7), then the apparatus continues its freeze record mode or still reproduction mode. If the freeze key FRZ is again actuated during this continued mode, the control returns to Step S2 whereat a new still image is again stored in the memory 10.

If the clear key CLR is actuated during the stroboscopic (record, reproduction) mode, freeze (record, reproduction) mode, or interval freeze record mode (Steps S6, S10, S13), under control of the system controller 34, the coefficient control circuit 32 causes the coefficient unit 14 to set the coefficient K=0. As a result, the apparatus enters an ordinary mode wherein video signals from the switch 8 are directly outputted from the adder 16 (Step S14), to thereafter terminate the processing by the system controller.

As described so far, according to the VTR with a built-in camera of this embodiment, a function to provide special effects such as a freeze interval record mode and a stroboscopic (record, reproduction) mode can be realized with simple operations. This embodiment therefore provides a considerably effective structure for applying such a novel feature to general electronic apparatuses.

As appreciated from the foregoing description, according to a video signal processing apparatus of the present invention, special effects can be realized with simple operations by using a so-called freeze function whereby a still image is obtained by sequentially reading video signals of one frame from a memory under a write inhibited state.

What is claimed is:

1. A video signal processing apparatus, comprising:
    (a) a signal processing circuit including a memory capable of storing one picture portion of a video signal;
    (b) a manually operable freeze key; and
    (c) control means for controlling a processing operation of said signal processing circuit upon a manual operation of said manually operable freeze key, said control means responsive to the manual operation of said manually operable freeze key, inhibiting to write the video signal to said memory and allowing to repeatedly read one picture portion of the video signal from said memory, and said control means responsive to a continuous operation of said manually operable freeze key in excess of a period of a first predetermined time, allowing to periodically write one picture portion of the video signal to said memory at an interval of a second predetermined time and to repeatedly read one picture portion of the video signal from said memory, the first predetermined time and the second predetermined time being individually determined.

2. An apparatus according to claim 1, further comprising:
    image pickup means for generating the video signal from an optical image; and
    recording means for recording the video signal on a recording medium,
    wherein the video signal from said image pickup means is inputted to said signal processing circuit, and the video signal outputted from said signal processing circuit is supplied to said recording means.

3. An apparatus according to claim 2, further comprising:
    reproducing means for reproducing the video signal from said recording medium,
    wherein the video signal from said reproducing means is further inputted to said signal processing circuit.

4. An apparatus according to claim 1, wherein said signal processing circuit allows both to repeatedly write one picture portion of the video signal into said memory and to repeatedly read one picture portion of the video signal from said memory.

5. A video signal processing device, comprising:
    (a) a manually operable freeze key;
    (b) a signal processing circuit for processing a video signal, said signal processing circuit responsive to an operation of said manually operable freeze key, being capable of taking a freeze mode wherein one picture portion of the video signal is repeatedly read; and
    (c) updating means for periodically updating one picture portion of the video signal repeatedly outputted from said signal processing circuit at an interval of a second predetermined time in response to a continuous operation of said manually operable freeze key in excess of a period of a first predetermined time while said signal processing circuit takes the freeze mode, the first predetermined time and the second predetermined time being individually determined.

6. A device according to claim 5, wherein said signal processing circuit is adapted to directly output the video signal.

7. A video signal processing device, comprising:
    (a) a signal processing circuit for processing a video signal, said signal processing circuit being capable of taking one of a first mode, a second mode and a third mode, in the first mode all picture portions of the video signal being outputted, in the second mode one picture portion of the video signal being repeatedly outputted, and in the third mode one picture portion of the video signal updated at an interval of a second predetermined time being repeatedly outputted;
    (b) a manually operable freeze key; and
    (c) control means for changing modes of said signal processing circuit in response to an operation of said manually operable freeze key, said signal processing circuit responsive to an operation of said manually operable freeze key, changing from the first mode to the second mode, and said signal processing circuit responsive to a continuous operation of said manually operable freeze key in excess of a period of a first predetermined time, changing from the second mode to the third mode, the first predetermined time and the second predetermined time being individually determined.

8. A video signal processing apparatus, comprising:
    (a) a signal processing circuit for processing a video signal, said signal processing circuit being capable of taking a freeze mode whereby one picture portion of the video signal is repeatedly outputted;
    (b) recording means for recording the video signal from said signal processing circuit on a recording medium, said recording means being capable of taking an interval record mode whereby the video signal is recorded at an interval of a predetermined time for only a part of the predetermined time; and
    (c) updating means for updating one picture portion of the video signal outputted from said signal processing circuit at an interval of the predetermined time, when said signal processing circuit takes the freeze mode and said recording means takes the interval record mode.

9. An apparatus according to claim 8, further comprising image pickup means for generating the video signal from an optical image, wherein said signal processing circuit is inputted with the video signal from said image pickup means.

10. An apparatus according to claim 8, wherein said signal processing circuit is adapted to output the video signal without processing.

11. A video signal processing apparatus, comprising:
(a) a signal processing circuit including a memory capable of storing one picture portion of a video signal, said signal processing circuit being capable of taking a freeze mode whereby said signal processing circuit inhibits to write the video signal to said memory and allows to repeatedly read one picture portion of the video signal from said memory;
(b) recording means for recording the video signal outputted from said signal processing circuit on a recording medium, said recording means being capable of taking an interval record mode whereby the video signal is recorded at an interval of a predetermined time for only a part of the predetermined time; and
(c) control means for controlling to write the video signal to said memory at an interval of the predetermined time, when said signal processing circuit takes the freeze mode and said recording means takes the interval record mode.

12. A video signal processing apparatus, comprising:
(a) a signal processing circuit including a memory capable of storing one picture portion of a video signal;
(b) a manually operable freeze key; and
(c) control means for controlling a processing operation of said signal processing circuit upon a manual operation of said manually operable freeze key, said control means responsive to the manual operation of said manually operable freeze key, inhibiting to write the video signal to said memory and allowing to repeatedly read one picture portion of the video signal from said memory, said control means responsive to a continuous operation of said freeze key in excess of a predetermined time period, starting a periodic operation to periodically write one picture portion of the video signal to said memory and to repeatedly read one picture portion of the video signal from said memory, and said control means being able to continue said periodic operation irrespective of a manual operation of said manually operable freeze key.

13. An apparatus according to claim 12, further comprising a manually operable clear key, wherein said control means stops the periodic operation in response to a manual operation of said manually operable clear key.

14. A video signal processing device, comprising:
(a) a manually operable freeze key:
(b) a signal processing circuit for processing a video signal, said signal processing circuit responsive to an operation of said manually operable freeze key, being capable of taking a freeze mode wherein one picture portion of the video signal is repeatedly read; and
(c) updating means for periodically updating one picture portion of the video signal repeatedly outputted from said signal processing circuit at an interval of a second predetermined time in response to a continuous operation of said manually operable freeze key in excess of an interval of a first predetermined time while said signal processing circuit takes the freeze mode, said updating means being able to continue an operation of periodically updating one picture portion of the video signal irrespective of a manual operation of said manually operable freeze key.

15. An apparatus according to claim 14, further comprising a manually operable clear key, said updating means stopping the operation of periodically updating in response to a manual operation of said manually operable clear key.

16. A video signal processing apparatus, comprising:
(a) a signal processing circuit including a memory capable of storing one picture portion of a video signal;
(b) a manually operable freeze key;
(c) measuring means for measuring an elapsed time from starting a manual operation of said manually operable freeze key, said measuring means outputting a command when the elapsed time reaches a predetermined time; and
(d) control means for controlling a processing operation of said signal processing circuit, said control means responsive to starting the manual operation of said manually operable freeze key, inhibiting to write the video signal to said memory and allowing to repeatedly read one picture portion of the video signal from said memory, said control means starting a periodic operation to periodically write one picture portion of the video signal to said memory and to repeatedly read one picture portion of the video signal from said memory in response to the command from said measuring means.

17. A video signal processing device, comprising:
(a) a manually operable freeze key;
(b) measuring means for measuring an elapsed time from starting a manual operation of said manually operable freeze key, said measuring means outputting a command when the elapsed time reaches a predetermined time; and
(c) a signal processing circuit for processing a video signal, said signal processing circuit responsive to starting the manual operation of said manually operable freeze key, being capable of taking a freeze mode wherein one picture portion of the video signal is repeatedly read; and
(d) updating means for periodically updating one picture portion of the video signal repeatedly outputted from said signal processing circuit at an interval of a second predetermined time in response to the command from said measuring means.

18. A video signal processing device, comprising:
(a) a signal processing circuit for processing a video signal, said signal processing circuit being capable of taking one of a first mode, a second mode and a third mode, in the first mode all picture portions of the video signal being outputted, in the second mode one picture portion of the video signal being repeatedly outputted, and in the third mode one picture portion of the video signal being repeatedly outputted;
(b) a manually operable freeze key;
(c) measuring means for measuring an elapsed time from starting a manual operation of said manually operable freeze key, said measuring means outputting a command when the elapsed time reaches a predetermined time; and
(d) control means for changing the modes of said signal processing circuit, said signal processing circuit responsive to starting the manual operation of said manually operable freeze key, changing from the first mode to the second mode, and said signal processing circuit responsive to the command from said measuring means, changing from the second mode to said the mode.

19. A video signal processing apparatus, comprising:
(a) a signal processing means including a memory capable of storing one picture of a video signal and updating the one picture of the video signal stored in said memory at a period of a first time, said signal processing means being capable of repeatedly reading out the one video signal from said memory and repeatedly outputting the one picture of the video signal at a period of a second time shorter than said first time; and (b) recording means for recording the video signal outputted from said signal processing means on a recording medium, said recording means being capable of operating in an interval record mode having a time period associated with said first time, including a time period during which the video signal from said signal processing means is recorded and a time period during which the video signal is not recorded.

* * * * *

UNITED STATES PATENT AND TRADEMARK OFFICE
CERTIFICATE OF CORRECTION

PATENT NO. : 5,519,448
DATED : May 21, 1996
INVENTOR(S) : KENICHI NAGASAWA ET AL.   Page 1 of 2

It is certified that error appears in the above-identified patent and that said Letters Patent is hereby corrected as shown below:

Title page, col. 2,

AT [56] REFERENCES CITED

Attorney, Agent or Firm,
"Fitzpatrick, Cella Harper & Scinto" should read
--Fitzpatrick, Cella, Harper & Scinto--.

COLUMN 1

Line 50, "reading" should read --read--.

COLUMN 6

Line 56, "outputted" should read --repeatedly outputted--.

COLUMN 7

Line 63, "An apparatus" should read --A device--.

UNITED STATES PATENT AND TRADEMARK OFFICE
CERTIFICATE OF CORRECTION

PATENT NO.    : 5,519,448
DATED         : May 21, 1996
INVENTOR(S)   : KENICHI NAGASAWA ET AL.

It is certified that error appears in the above-identified patent and that said Letters Patent is hereby corrected as shown below:

COLUMN 8

Line 60, "said the" should read --said third--.

Signed and Sealed this

Twenty-fourth Day of September, 1996

Attest:

BRUCE LEHMAN

Attesting Officer        Commissioner of Patents and Trademarks